United States Patent [19]
Bertolino

[11] 3,946,355
[45] Mar. 23, 1976

[54] MULTIPLEXING DEVICE FOR PANORAMIC SONAR SYSTEMS

[75] Inventor: Charles Bertolino, Six-Fours-les-Plages, France

[73] Assignee: Etat Francais, Paris, France

[22] Filed: Sept. 4, 1974

[21] Appl. No.: 503,155

[30] Foreign Application Priority Data
Sept. 17, 1973 France .............................. 73.33197

[52] U.S. Cl. ................................................. 340/6 R
[51] Int. Cl.² .......................................... G01S 3/80
[58] Field of Search .......................... 340/6 R, 16 R

[56] References Cited
UNITED STATES PATENTS

| | | | |
|---|---|---|---|
| 3,356,989 | 12/1967 | Autrey | 340/6 R |
| 3,370,267 | 2/1968 | Barry | 340/6 R |
| 3,810,082 | 5/1974 | Arens | 340/6 R |

Primary Examiner—Richard A. Farley
Attorney, Agent, or Firm—Larson, Taylor and Hinds

[57] ABSTRACT

A multiplexing device is provided which is used in listening channels for a panoramic sonar system. An arrangement of a multiplexer, a demultiplexer and a storage register provide a circular permutation of hydrophone inputs to a time delay network. The resultant rotation of these inputs, as provided by appropriate gating circuits, is used forming the desired listening channels for the sonar system.

6 Claims, 18 Drawing Figures

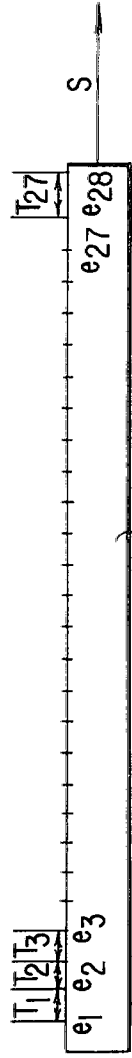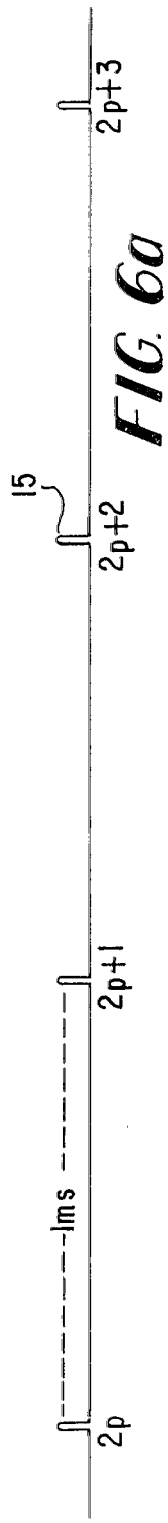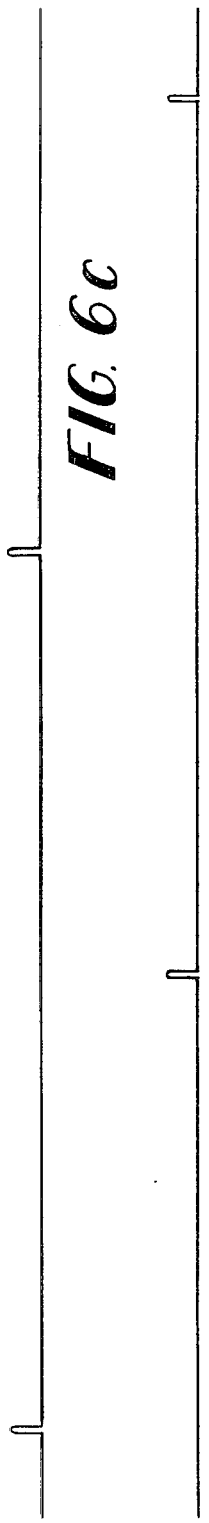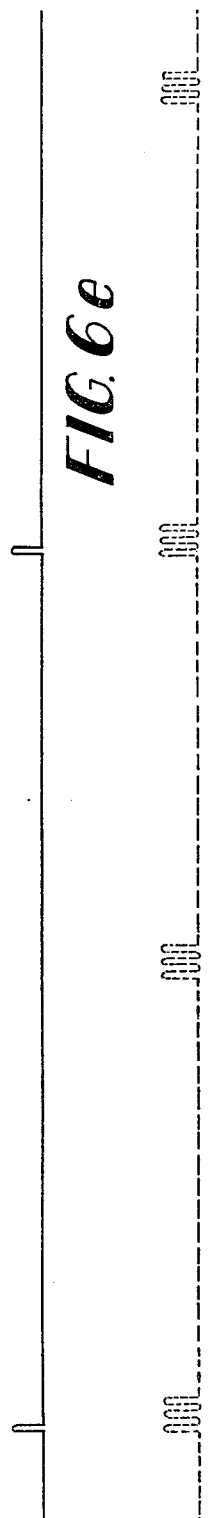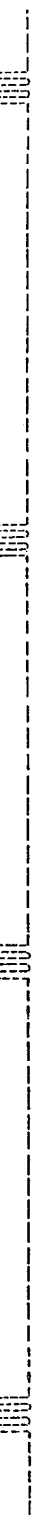

MULTIPLEXING DEVICE FOR PANORAMIC SONAR SYSTEMS

FIELD OF THE INVENTION

This invention relates to sonar systems and, more particularly, to a multiplexing device for the formation of listening channels in a sonar system.

BACKGROUND OF THE INVENTION

Electronically scanned sonars are utilized to detect the location of a target. Such sonars are mounted, for example, on buoys dropped by a plane and serve to transmit information on the location of a target, e.g a submarine, which emits sound waves or reflects echoes.

Electronically scanned sonars characteristically employ a cylindrical transducer array with a vertical axis over whose periphery are placed uniformly spaced hydrophones. Monitoring of the space surrounding the sonar is accomplished by establishing listening channels employing a delay line and by electronically scanning these channels of which each corresponds to a given bearing. As an example, such a sonar may have 28 rows of hydrophones spaced uniformly around an axis to form 56 listening channels corresponding to 56 bearings. Two channels are formed between every two hydrophones, the channels having positions symmetrical in relation to the line bisecting the angle defined by the two hydrophones.

If a sound is generated in the direction of a given channel, the resulting sound waves picked up by the different hydrophones have differences in phase or delay determined by the respective position of the channel and the hydrophones. The electric signals emitted by the hydrophones exhibit the same delays between them. Each hydrophone is connected to the input of a delay line which corrects the phase differences between the different signals and brings them all into phase. Consequently, if a target is located in the direction of a channel, there will be received, at the output of the delay line, an electrical signal which will be the sum of all the electric signals emitted by the different hydrophones. On the other hand, if the target is located in another direction, the phase shifts between signals emitted by the different hydrophones are no longer identical with the phase shifts introduced by the delay line and the sum of signals obtained at the output of the delay line will have a lower amplitude.

The channels and the hydrophones occupy respective positions which are repeated by rotation around the vertical axis constituting an axis of symmetry. The different channels can thus be scanned at a given rate by a "circular permutation" of the hydrophones connected to each of the terminals of the delay line.

In presently existing sonars, electronic scanning is accomplished by connecting to each of the terminals of the delay line, a multiplexer provided with as many inputs as the transducer array has hydrophones and a single output connected to such terminals. The multiplexer is of known design and is an electronic switching device with several inputs and only one output. Each input is permanently connected to a line receiving an electric signal. The multiplexer has an address file which receives pulses that successively switches the different inputs to the single output. For example, the different inputs can be energized by circular permutation of each one in turn at each new inpulse. The lines leading to the inputs can be energized in any given sequence and, the step of the permutation may be simple or multiple. Scanning devices having as many multiplexers as pickups are expensive and cumbersome.

SUMMARY OF THE INVENTION

This invention is intended to simplify and miniaturize the multiplexing devices discussed above to enable scanning of a panoramic sonar basically comprising a transducer array with n rows of hydrophones spaced uniformly around an axis, together with a scanning device comprising not less than one delay line and a multiplexing device inserted between the antenna and these delay lines where the scanning device serves to establish and cyclically monitor the listening channels.

This invention is based on the general property of the listening channels to be arranged in one or several groups whereby each group is formed exclusively of channels whose position in relation to the hydrophone rows is defined by the relative position of the adjacent channels of the same group through constant rotation around the antenna axis. It follows from this property that the order of connecting the hydrophones to the inputs of the delay lines in order to form one channel of a group can be deduced from the order of connection thereby leading to the formation of the preceding channel of the same group, by applying a circular permutation of constant step $r$ to the reference numbers of the hydrophones, numbered in sequence.

According to the invention, a multiplexing device comprising a single multiplexer with $n$ inputs whose output is coupled to the input of a demultiplexer with $n$ outputs. The $n$ rows of hydrophones are permanently and successively connected to the $n$ inputs of the multiplexer. The address files of multiplexer and demultiplexer are connected in parallel to the same source of $n$ pulse trains controlling the scanning of the inputs, and the address file of the multiplexer is additionally connected to an incrementation line fed from a source of periodic $r$ pulse trains in such manner that the device furnishes, at the outputs of the demultiplexer, signals derived from the hydrophone rows in a sequence which can be determined from the order of the inputs through successive circular permutations of step $r$.

Monitoring of the listening channels at the rate of one channel per unit of time, is controlled from a time base and it is preferable that the frequency of the $n$ control pulses of the address files of multiplexer and demultiplexer is not less than equal to $n$ times the frequency of the time-base pulses so that the $n$ inputs of the multiplexer are completely scanned during each unit of time.

When the sonar has as many channels as there are hydrophone rows, the channels form a single group. Under this condition, the incrementation line of the multiplexer address file is connected to the oscillator generating the time-base pulses in such a manner that the signals corresponding to the reference numbers of the hydrophones appear at the outputs of the demultiplexer during each unit of time, in an order, which can be determined from the order during the preceding unit of time, by a circular permutation with a step of 1.

When the sonar has a number of channels equal to $k$ times the number of hydrophones where $k$ is a whole number greater than 1, the channels form $k$ groups. Under this condition, the incrementation line of the multiplex address file is connected to the oscillator which generates the time-base pulses by means of a device for dividing the frequencies by $k$ in such a manner that the outputs of the demultiplexer scan the hydrophone rows in the same order $k$ times during $k$ units of time in succession where that order is controlled by circular permutation of a step of 1 during the preceding $k$ units of time.

When the sonar has $n$ hydrophone rows and $n/k$ channels (where $k$ is a whole number greater than 1), the incrementation line of the multiplex address file is connected to a generator of periodic $k$ pulse trains generated at the start of each unit of time in such manner that the order of appearance of hydrophone reference signals at the multiplex outputs changes all units of time by a circular permutation of a step equal to $k$.

In accordance with one feature of the invention wherein the device has a single delay line with $n$ inputs, the initial order of connecting the $n$ demultiplexer outputs to the $n$ inputs of the delay line is accomplished by forming a square matrix in which the number of lines and columns is equal to the overall delay of the delay line expressed in units of time and then entering in the diagonal of this matrix, passing through the intersection of line 0 and column 1, the reference numbers of the hydrophones successively encountered by the front of an acoustic wave originating from a source located in the direction of the first listening channel, where the angular displacements between these reference numbers are proportional to the partial delays between the signals and by further applying to the hydrophone reference numbers a regression of step $r$ by ascending toward the first line of the matrix which furnishes such initial order of connection. This aspect of the invention should be more easier understood from a consideration of specific examples set forth below.

When the channels form two groups, called odd and even, the initial order of connections for forming the odd and even channels is obtained by establishing the same matrix. In addition, by entering on a second line parallel to this diagonal running through the intersection of column 1 and line 1, there can be obtained the hydrophone reference numbers encountered successively by the front of an acoustic wave generated by a source located in the direction of the second listening channel, where the angular displacements between these reference numbers are identical to the angular displacements between the reference numbers carried in this diagonal, and, by applying to the reference numbers of the hydrophones entered in the diagonal, as well as to the reference numbers of the hydrophones entered on this line parallel to the diagonal of the matrix, regressions of a step of 1 by ascending two lines at a time toward the top of the matrix. The hydrophone reference numbers entered in the first and second line of the matrix furnish the initial order of connections at time 0 and at time 1.

In a preferred embodiment providing two odd and even groups of channels, there is inserted between the demultiplexer outputs and the delay-line inputs a validation switch activated by the time-base pulse which alternately clears passage of one or the other of the signals appearing at each of the two multiplex outputs connected in parallel to the same input of the delay line.

The invention thus results in the formation of, through multiplexing, different listening channels for the purpose of cyclic monitoring of the channels in a panoramic sonar. The advantages of the multiplexing devices proposed in the invention include the fact that the number of multiplex circuits is reduced to a single multiplexer coupled to a demultiplexer. Such a reduction in circuitry obviously brings about savings in the implementation of the circuits and, more specifically, reduces the weight and size of the circuitry required, thus allowing miniaturization of the circuits and reducing the size of their associated housings so as to permit incorporation of the circuitry in a small-size buoy that can be dropped by a plane.

Other features and advantages of the invention will be set forth in, or will be apparent from, a detailed description of the preferred embodiments found hereinbelow.

BRIEF DESCRIPTION OF THE DRAWINGS

FIG. 3 is a block form schematic diagram of a time delay network used in implementing the invention.

FIGS. 6a, 6b, 6c, 6d, 6e and 6f are diagrams of pulses at various points of the multiplexing device in FIG. 4.

DESCRIPTION OF THE PREFERRED EMBODIMENT

As an aid to understanding the invention, a simplified sonar system as shown in FIGS. 1A–1H will be considered. The system consists of four hydrophones $H_1$, $H_2$, $H_3$ and $H_4$. With these four hydrophones, eight listening directions, or channels, $C_1$, $C_2$, $C_3$, $C_4$, $C_5$, $C_6$, $C_7$ and $C_8$, are formed. All four hydrophones will pick up any sound coming from any direction, but, their electrical outputs will vary in time according to wave propagation delay in the monitoring medium. (i.e. water).

Figure 1A:
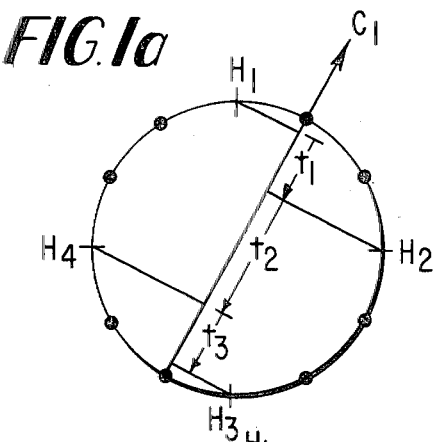
FIGS. 1A–1H are schematic diagrams of a simplified sonar transducer array illustrating the positions of hydrophones and the directions of listening channels.
Figure 1B:
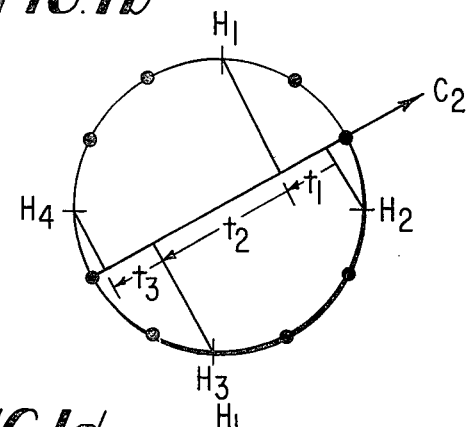
Figure 1C:
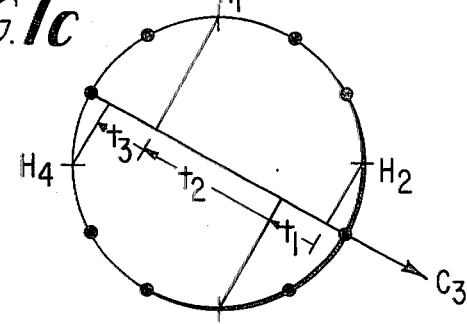
Figure 1D:
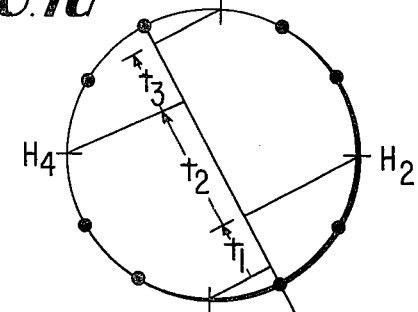
Figure 1E:
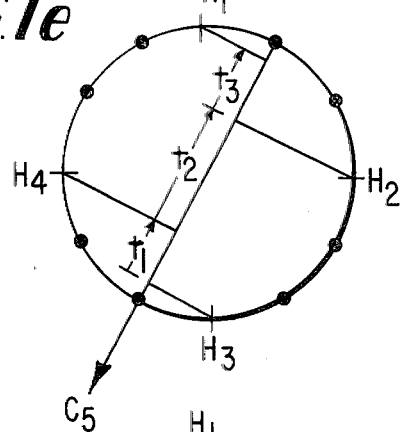
Figure 1F:
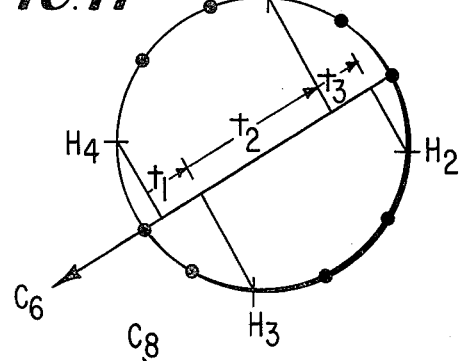
Figure 1G:
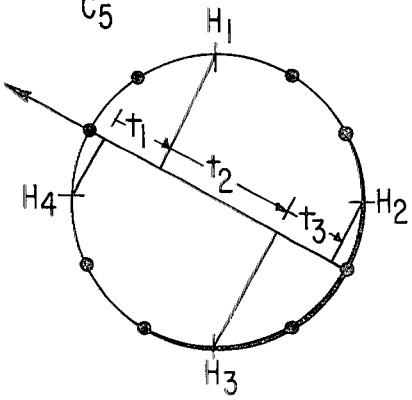
Figure 1H:
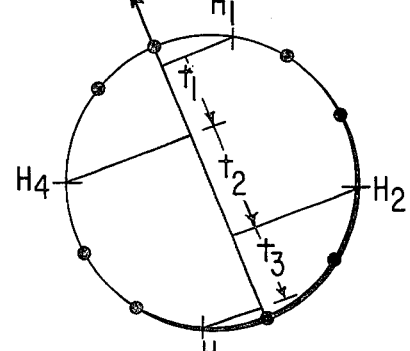

Referring to FIG. 1A, a channel $C_1$ is illustrated. Echoes coming from the direction of channel $C_1$ will first be picked up by hydrophone $H_1$. After a time $t_1$, hydrophone $H_2$ will pick up the wave. After a time $t_1 + t_2$, hydrophone $H_4$ will receive the wave and hydrophone $H_3$ will receive the wave after a time $t_1 + t_2 + t_3$. By inserting a time delay inbetween the signals from hydrophones $H_1$, $H_2$, and $H_4$, an output summing network can be made to receive all four signals at the same time. To explain, if the signal from hydrophone $H_1$ is delayed for a time $t_1 + t_2 + t_3$, the signal for hydrophone $H_2$ is delayed for a time $t_2 + t_3$, and the signal from hydrophone $H_4$ is delayed for a time $t_3$, then all four signals will arrive at a summing network at the same time. Furthermore, the output of the summing network will have maximum amplitude only when an echo comes from the direction of $C_1$ because that is the only direction for which time delays $t_1$, $t_2$ and $t_3$ provide proper compensation and cause all four signals to arrive simultaneously. Thus, channel $C_1$ is formed by the sum of: The output from hydrophone $H_3$, plus the signal from hydrophone $H_4$ delayed by $t_3$, plus the signal from hydrophone $H_2$ delayed by $t_2 + t_3$, plus the signal from hydrophone $H_1$ delayed by $t_1 + t_2 + t_3$.

In a similar manner, a second listening channel $C_2$ is formed by a combination of a signal from hydrophone $H_4$, a signal from hydrophone $H_3$ delayed by a time $t_3$, a signal from hydrophone $H_1$ delayed by a time $t_2 + t_3$, and a signal from hydrophone $H_2$ delayed by a time $t_1 + t_2 + t_3$. Note that due to the symmetrical arrangement of the four hydrophones and the eight listening directions, time delays $t_1$, $t_2$ and $t_3$ for channel $C_1$ are the same as time delays $t_1$, $t_2$, and $t_3$ for all other channels. Thus, the eight channels are formed and can be represented by the following table:

| Time Delay: $t_3$ | | $t_2 + t_3$ | $t_1+t_2+t_3$ | No delay |
|---|---|---|---|---|
| channel c1 | $H_4$ | $+H_2$ | $+H_1$ | $+H\ H_3$ |
| C2 | $H_3$ | $H_1$ | $H_2$ | $H_4$ |
| C3 | $H_1$ | $H_3$ | $H_2$ | $H_4$ |
| C4 | $H_4$ | $H_2$ | $H_3$ | $H_1$ |
| C5 | $H_2$ | $H_4$ | $H_3$ | $H_1$ |
| C6 | $H_1$ | $H_3$ | $H_4$ | $H_2$ |
| C7 | $H_3$ | $H_1$ | $H_4$ | $H_2$ |
| C8 | $H_2$ | $H_4$ | $H_1$ | $H_3$ |

Once the combinations of hydrophones are determined for channels C1 and C2, succeeding odd numbered channels are derived from Channel C1 and even numbered channels are derived from Channel C2. For example, if a simple circular permutation, i.e. where "one" is added to each reference number of the hydrophones, is applied to channel C1, channel C3 is derived. If the same permutation is applied to channel C3, channel C5 is formed. Channel C7 is similarly derived from channel C5 and channel C1 can be derived from channel C7, thus completing the circle. Similarly, the same permutation changes channel C2 into channel C4, channel C4 into channel C6, and channel C6 into channel C8 and channel C8 back into channel C2 again.

Thus, in order to form each set of four channels, one merely requires a time delay network capable of applying a zero time delay to one input, a time $t_3$ delay to a second input, a time delay $t_2 + t_3$ to a third input and a time delay $t_1 + t_2 + t_3$ to a fourth input, and a device for circularly shifting the four inputs according to the above table. Since the "odd" group and the "even" group do not have any relationship, a selector circuit is also required to determine whether an "odd" or "even" channel is being formed.

According to the invention, the required circular permutation is achieved through the use of a multiplexer and a demultiplexer that step their address registers synchronously. However, the multiplexer can also be stepped externally to supply the "add one" to each hydrophone reference number to provide the circular permutation. The selection between "odd" or "even" groups is acheived by simple gating techniques using conventional AND and OR gates.

Figure 2:
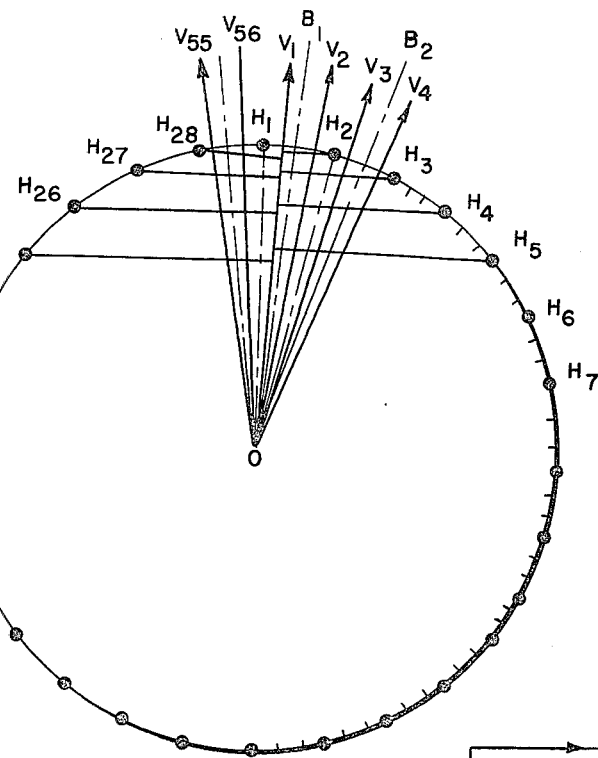
FIG. 2 is a schematic transverse section of a sonar transducer array illustrating the positions of hydrophones and listening channels.

Referring to FIG. 2, a cylindrical transducer array with vertical axis 0 in horizontal section is shown. As an example, the transducer array has 28 rows of hydrophones H1 to H28 spaced uniformly around the entire circumference. This transducer array serves a panoramic sonar which has, for example, 56 listening channels numbered V1 to V56. The hydrophones and the channels are numbered in ascending order in a clockwise direction. The channels are numbered in the order in which they appear.

Two channels are located between two consecutive hydrophones e.g. channels V1 and V2 are located between the two hydrophones H1 and H2. These channels, V1, V2, are symmetrical in relation to the line B1 bisecting the angular sector defined by hydrophones H1 and H2. The channels are divided into two groups: one with even and the other with odd numbers. In each group any channel occupies a position in the relation to the hydrophones which can be derived from the position of the adjacent channels by constant rotation around the antenna axis. Consequently, the order of connecting the hydrophones so as to form given channel of a group can be derived from the order, which leads to forming the preceding channel of the same group through a circular permutation of step $r$ as described hereinabove. This is a general property of all panoramic sonars having a number of channels which is a whole or franctional multiple of the number of hydrophones.

If the number of channels is equal to the number of hydrophones, the channels form a single group and we proceed from one channel to the next by a progression of steps $r$ equal to 1. As an example, if the number of channels is equal to one-half of the number of hydrophones, we proceed from one channel to the next by a progression of steps $r$ equal to 2. If the number of channels is equal to three times the number of hydrophones, the channels are subdivided into three groups and, within each group, we proceed from one channel to the next by a progression on the hydrophones of a step equal to 1.

Referring to FIG. 3, the channels are formed with a delay line 1 having a number of inputs, denoted $e1$ to $e28$, equal to the number of hydrophones, i.e. 28, and a single output s. Delay line 1 introduces the partial delays, labeled $t1$ to $t27$, respectively between the signals picked up at each input.

Referring again to FIG. 1, the orthogonal projections of the different hydrophones in the direction V1 are shown. It will be seen that the latter are projected in the order H1, H2, H28, H3, H28, H26, etc. These projections basically correspond to the front of propagation of a plane wave originating from a target located in the direction V1.

The partial delays $t1$, $t2$, etc. of the delay line 1 are selected so that they are equal to the delays separating the successive signals emitted by the different hydrophones when the latter pick up a plane wave from the target located in the direction V1. A unit of time is chosen so that the partial delays can be expressed in multiples of this unit of time. The table below shows the partial delays expressed as unit of time in accordance with a specific illustrative example. In this specific embodiment, the time required for forming channels is one channel per unit of time and consequently, information for the delay line is scanned at the rate of one channel per unit time. These are controlled by constant-frequency pulses furnished by an oscillator acting as time base.

| INPUTS | PARTIAL TIME DELAYS | PARTIAL TIME DELAY VALUES | TOTAL TIME DELAY VALUES |
|---|---|---|---|
| e1 | | | 0 |
| | t1 | 2 | |
| e2 | | | 2 |
| | t2 | 3 | |
| e3 | | | 5 |
| | t3 | 2 | |
| e4 | | | 7 |
| | t4 | 3 | |
| e5 | | | 10 |
| | t5 | 3 | |
| e6 | | | 13 |
| | t6 | 2 | |
| e7 | | | 15 |
| | t7 | 3 | |
| e8 | | | 18 |

-continued

| INPUTS | PARTIAL TIME DELAYS | PARTIAL TIME DELAY VALUES | TOTAL TIME DELAY VALUES |
|---|---|---|---|
| e9 | | | 21 |
| | t8 | 3 | |
| e10 | | | 23 |
| | t9 | 2 | |
| e11 | | | 25 |
| | t10 | 2 | |
| e12 | | | 29 |
| | t11 | 4 | |
| e13 | | | 31 |
| | t12 | 2 | |
| e14 | | | 33 |
| | t13 | 2 | |
| e15 | | | 36 |
| | t14 | 3 | |
| e16 | | | 38 |
| | t15 | 2 | |
| e17 | | | 41 |
| | t16 | 3 | |
| e18 | | | 43 |
| | t17 | 2 | |
| e19 | | | 46 |
| | t18 | 3 | |
| e20 | | | 49 |
| | t19 | 3 | |
| e21 | | | 52 |
| | t20 | 3 | |
| e22 | | | 57 |
| | t21 | 5 | |
| e23 | | | 59 |
| | t22 | 2 | |
| e24 | | | 64 |
| | t23 | 5 | |
| e25 | | | 66 |
| | t24 | 2 | |
| e26 | | | 69 |
| | t25 | 3 | |
| e27 | | | 73 |
| | t26 | 4 | |
| e28 | | | 79 |
| | t27 | 6 | |

Column 1 of the above table shows the successive inputs of the delay line $e1$, $e2$ to $e28$ numbered in ascending order in the direction of the output $s$. Column 2 shows the partial delays $t1$, $t2$ to $t27$ introduced by the delay line, and column 3 represents the durations of these partial delays expressed as a unit of time. Column 4 represents the total time separating the pickup of a signal at input $e1$ and its passage by each of the other inputs.

Figure 4:
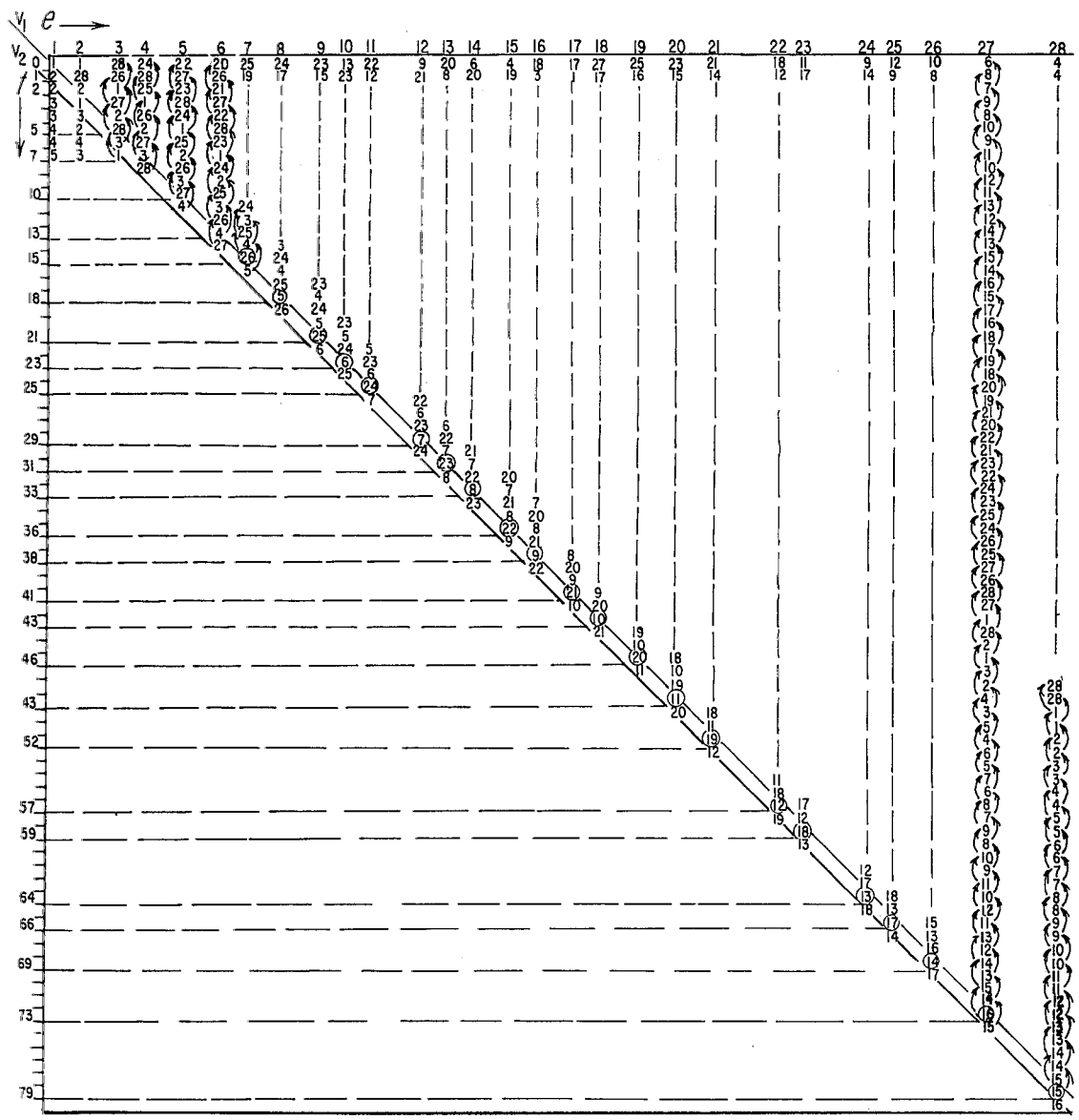
FIG. 4 is a table of hydrophone connections to form various listening channels.

By starting from the values of the partial delays shown in the above table, the table of FIG. 4 is formed which allows one to find the initial order of connecting the testing hydrophones to the inputs of the delay line.

The table of FIG. 4 has the form of a square matrix with a number of lines and columns equal to the total time shown in the tables of FIG. 4 or 79. In the column at left are indicated the successive overall times displayed in column 4 of the table in FIG. 4. These overall times are spaced from each other by a number of lines equal to the partial times indicated in column 3 of the table in FIG. 4. At the top of the table are indicated the successive inputs of the delay line; these inputs are spaced from each other by a number of intervals equal to the duration of the partial delay which separates two signals picked up simultaneously at these inputs. Along the diagonal passing through the intersection of line $t0$ and column $e1$, at the points of intersection of the lines and column, which show the reference numbers of the delay-line inputs, the reference numbers of the hydrophones are entered in the order in which the latter pick up a plane wave originating from a target located in the direction of channel V1, i.e. the order 1, 2, 28, 3, 27, 4, 26 . . . 17, 14, 16, 15 outlined above.

Since the formation of the second channel is offset by one unit of time, we enter on the second line parallel to the preceding diagonal and running through the intersection of column $e1$ and line $t1$, the reference numbers of the hydrophones in the order in which the latter pick up a plane wave originating from a target located in direction of channel V2. A geometric construction analogous to that of FIG. 1 by projecting the hydrophones orthogonally in the direction V2, shown that this order is as follows: 2, 1, 3, 28, 4, 27, 5 . . . 14, 17, 15, 16. Since channel V2 is symmetrical to channel V1 in relation to the bisector B1, the successive partial delays are equal to those for channel V1. The diagonal thus corresponds to the odd-channel group and the line parallel to the diagonal and below the latter corresponds to the even-channel group.

On the basis of these data, it is possible to construct all of the table by recalling that each channel of a group can be derived from the preceding one by a progression of step $r = 1$ of the reference numbers of the hydrophones, in the case here presented. As already explained above, the step of progression may be greater than 1 if the number of channels may form a single group or also more than two groups.

In the embodiment presented, it is noted as an example that channel V1 is constituted by addition of the signal picked up by hydrophone H1 at time 0; of the signal picked up by hydrophone H2 at time 2; of the signal picked up by hydrophone H28 at time 5; of the signal picked up by hydrophone H3 at time 7, and so on to the signal picked up by hydrophone H15 at time 79. The output signal of channel 1 constituted by the sum of all these signals will appear at output $s$ of delay line 1 at time 79.

Channel V3 is derived from channel V1 by a progression of the hydrophone reference numbers of step $r = 1$ and a shift in time of two units. Likewise, channel V4 is derived from channel V2 by a progression of hydrophone reference numbers of step $r = 1$ and a shift in time of two units. Note that a progression of step 1 applied to hydrophone H28 gives us hydrophone H1.

In the same way, the preceding channels V1 and V2, i.e. channels 27, 26, etc. are formed by applying to the reference numbers of the hydrophones a regression of step $r = 1$ by ascending each time two units of time until the second line, corresponding to time 1, is reached.

The reference numbers so determined, which appear in the first and second line of the table, indicate the initial order of connecting the hydrophones to the inputs of the delay line. For example, at the instant 0, hydrophone H1 is initially connected to inputs $e1$ and $e2$, hydrophone H28 to input $e3$, hydrophone 24 to input $e4$, and so on, to hydrophone H4 connected to input $e28$.

The table of FIG. 4 provides a way to find the initial order of connecting the hydrophones to the inputs of the delay line respectively at time 0 and time 1 in order to form the odd and the even channels; these orders do not appear in any particular evident manner.

Once the initial connections of the hydrophones to the inputs of the delay line are defined for scanning all the channels, the numbers of the hydrophones connected to each of the inputs of the delay line are advanced, every two units of time by one step $r = 1$ in the case presented here.

Figure 5:
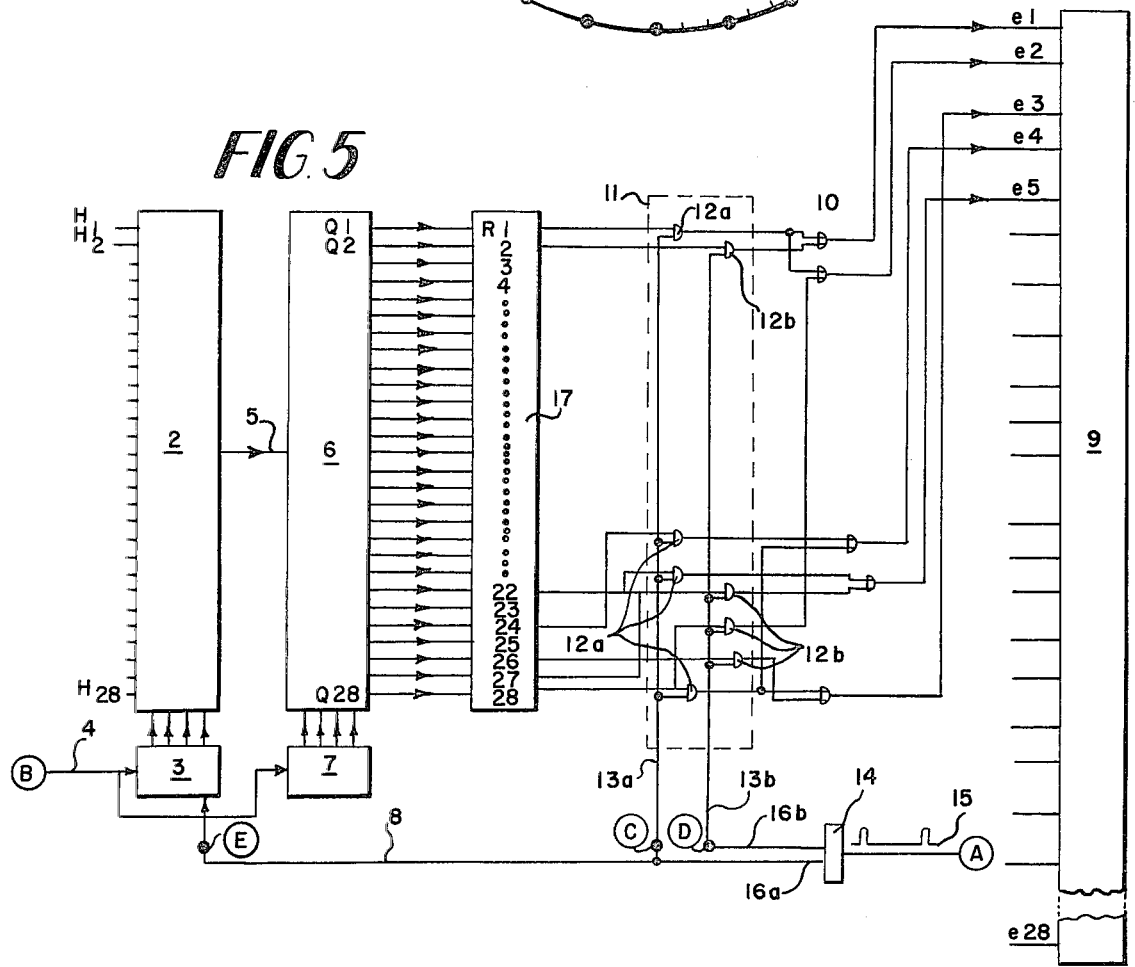
FIG. 5 is a schematic diagram in block form of the multiplexing device.

Referring to FIG. 5, a diagram of the multiplexing device utilized for cyclic monitoring of all channels in ascending order of their numbers is shown. The device comprises a multiplexer 2 with a number of inputs equal to the number of hydrophones, or 28, these inputs being numbered H1 to H28. To each of these inputs is permanently connected a hydrophone bearing the corresponding number. The order of connecting the hydrophones to the inputs is therefore the order of sequence in which the hydrophones appear in the transducer array in a clockwise direction. The address file of multiplexer 2 is denoted 3 and is controlled by pulse trains generated by an oscillaor connected into line 4. The single output 5 of multiplexer 2 is connected to the single input of a demultiplexer 6 with the same number of outputs as that of the hydrophones. Demultiplexer 6 is provided with an address file 7 also connected into line 4 in parallel with file 3.

The oscillator connected to line 4 has a multiple frequency of the time-base frequency where the multiplication factor is preferably not less than equal to the number of hydrophones so that, during each unit of time, the address files 3 and 7 receive a number of pulses equal to the number of hydrophones and monitor all hydrophones. Multiplexer 2 cyclically monitors the 28 hydrophones very rapidly in sequence during each unit of time. Each advances, by one unit, the number of the hydrophone whose signal appears at the single output 5. The signal received at input 5 of the demultiplexer 6 appears successively on each of its outputs Q1 to Q28.

The device of FIG. 4 also includes an incrementation line 8 which makes it possible to introduce into file 3, every two units of time, one or several pulses, and to advance the address file 3 by one step $r$ equal to the number of pulses ($r$ being equal to 1 in the example presented here).

Thus, during the first and second units of time, the outputs of the demultiplexer will successively display in their order the signals picked up by hydrophones H1, H2, H3 to H28. During the third and fourth units of time, these outputs will indicate in their order the signals picked up by hydrophones H2, H3, H4, etc, to H28, H1. This will then take place continually through circular permutation of step $r = 1$ every two units of time.

It should be noted that step $r$ may be other than 1. The number of units of time separating two booster impulses on line 8 of the address file 3 is equal to the number of groups of channels, with the property of passing from one element of a group to the next element of that group, by advancing the hydrophone reference numbers at a constant step.

A delay line is indicated at 9 having 28 inputs numbered $e1$ to $e28$ in the direction of increasing delays and an output $s$ at which are displayed the signals of the successive channels. The output terminals of the demultiplexer 6 are connected to the inputs of the delay line 9 according to the two orders of initial connection which are indicated by the first two lines of the table of FIG. 4. Each input of the delay line is connected to two lines by means of an OR-gate with two inputs. Each of the two inputs of the OR-gate is connected to one of the two outputs of the demultiplexer 6 with one of the two reference numbers indicated by the first two lines of the table in FIG. 4.

For example, in FIG. 5, the terminal $e1$ of the delay line 9 is connected by an OR-gate 10 in parallel to the outputs 1 and 2 of the demultiplexer 6; terminal $e2$ of the delay line 9 is connected in parallel with outputs 1 and 28; terminal $e3$ connected in parallel with outputs 28 and 26; terminal $e4$ connected in parallel with outputs 24 and 28; terminal $e5$ connected in parallel to outputs 22 and 27, and so on.

A switch 11 is inserted between the outputs of demultiplexer 6 and the OR-gates 10 for commutating, at the end of each unit of time, the two inputs of each OR-gate. The commutator referred to is constituted, for example, by pairs of AND-gates $12a$ and $12b$ inserted into the two lines connecting two outputs of the demultiplexer 6 to the two inputs of an OR-gate. Each AND-gate has a second input $13a$, $13b$, designated the validation input, which opens the gate when a pulse is applied thereto. The validation line $13a$ is connected in parallel to the validation inputs of all the gates $12a$ and the validation line $13b$ is connected in parallel to the validation inputs of all the gates $12b$. The lines $13a$ and $13b$ are pulsed alternately during each successive unit of time so that line $13a$ validates the units of time of even order and line $13b$ the units of time of odd order, or vice versa.

A frequency divider 14 receives time-base pulses indicated at 15. Output $16a$ of divider 14 is connected in parallel with the incrementation line 8 and the validation line $13a$. Output $16b$ of divider 14 is connected to the validation line $13b$. Frequency divider 14 can be a simple flip-flop.

A buffer storage network 17 with 28 inputs and 28 outputs is inserted between the outputs of the demultiplexer 6 and the commutator 11. The storage registers numbered R1–R28 serve to record the signals appearing successively at the outputs of the demultiplexer 6 during the monitoring cycles of the 28 hydrophones for restituting the signals simultaneously at the end of each monitoring cycle.

Referring to FIGS. 6a to 6e diagram of pulses in the circuit of FIG. 5 are shown. FIG. 6a shows the pulses 15 furnished by the time base input, the pulses being numbered $2p$, $2p+1$, $2p+2$, and so on in FIG. 6a and appearing at Point A in FIG. 5. FIG. 6b represents the 28 pulse trains which are directed to the address files 3 and 7 during each unit of time and which appear at Point B of FIG. 5. FIG. 6c shows the validation pulses on line $13a$ which are generated at the start of each unit of time of even order and appear at Point C in FIG. 5 and FIG. 6d shows the validation pulses on line $13b$ which are generated at the start of each unit of time of odd order and appear at point D in FIG. 5. FIG. 6e shows the incrementation pulses on line 8 which are simultaneous with the validation pulses on line $13a$ and which appear at Point E in FIG. 5.

The timing diagrams of FIG. 6a to 6e represent the situation where the channels are divided into two groups and where the order of succession of the hydrophones in each group for forming a channel is derived from the order of succession of the preceding channel by a progression of hydrophone reference numbers of step $r = 1$. For example, if the channels form a single group, there will not be a validation line of even and odd times and FIGS. 6c and 6d would be eliminated together with commutator 11 and the OR-gates of FIG. 10. Under these circumstances, pulses would appear on incrementation line 8 simultaneously with the pulses 15.

However, if the channels are divided into m groups, the OR-gates would be gates with m inputs and the AND-gates would be divided into groups with $m$ gates whose successive validations would be controlled by $m$ validation lines 13. In that case, the diagrams of FIG. 6 would have *m* validation lines on each of which would appear a validation pulse every *m* units of time. In FIG. 6*e*, the booster impulses would appear every *m* units of time.

If the step *r* of the hydrophone progression were equal to *r* instead of being equal to unity, it would be necessary, to obtain such a step, to introduce on line 8 of FIG. 5, successive pulse trains of *r* pulses long at the start of each unit of time.

In FIG. 6*f*, dotted lines represent the incrementation pulses in the case where, for example, the channels would form a single group and where we would advance from one channel to the next in the order of the hydrophones of a step equal to 3. This example corresponds to the case where the number of channels is equal to one-third of the number of hydrophones.

Thus, according to the invention, there is provided a general multiplexing system applicable to all panoramic sonars having hydrophones uniformly spaced around a vertical axis and a device for forming channels by means of delay lines where the number of channels is a multiple or submultiple of the number of hydrophones and the channels belong to groups in which the relative positions of the channels and hydrophones can be deduced from each other by rotation around a vertical axis.

Although the invention has been described with respect to exemplary embodiments thereof, it will be understood that variations and modifications can be effected in these embodiments without departing from the scope or spirit of the invention.

I claim:

1. A multiplexing system for a panoramic sonar used in the formation of listening channels, said system comprising
    a transducer array comprising n rows of hydrophones equally spaced around the longitudinal axis of said antenna;
    a multiplexing means, having n inputs and one output, connected to said hydrophones, each hydrophone being connected to one input of said multiplexing means, said multiplexing means including address storage means associated therewith for selecting individual ones of said inputs, in succession, to appear at said output;
    a demultiplexing means with one input and n outputs, said one input of said demultiplexing means being connected to said output of said multiplexing means and said demultiplexing means including address storage means associated therewith for directing said input of said demultiplexing means to each of said n outputs, one at a time, in succession, said address storage means of said multiplexing means and said demultiplexing means being connected to a first source of pulse trains each containing synchronizing pulses for synchronizing the operation of both said address storage means;
    a second pulse source of *r* pulses, connected to said multiplexing means so as to cause said multiplexing means to step the operation of said address storage means of said multiplexing means out of sychronism with said demultiplexing means; and
    a time delay network, having one output and n inputs, for producing time delays corresponding to the relative distance a plane wave of sound echoes, traversing said transducer array, would travel between said hydrophones, said n inputs of said time delay network each being connected to at least one output of said demultiplexing means and said output of said time delay network forming the output of said system.

2. A multiplexing system as claimed in claim 1 further comprising a storage register having *n* storage cells, the inputs of said storage cells being connected to the outputs of said demultiplexing means so as to store the outputs of said demultiplexing means.

3. A multiplexing system as claimed in claim 2 further comprising a gating means for directing said *n* outputs of said storage register to said *n* inputs of said time delay network, in a predetermined order, so as to form said listening channels at said output of said time delay network.

4. A multiplexing system as claimed in claim 3 wherein the number of said listening channels is equal to the number of said hydrophones *n*, said gating means comprising *n* direct connections, where *r* is equal to one, said first pulse source supplying *n* pulses to said multiplexing means and said demultiplexing means during each unit of time, and said second pulse producing one pulse per unit time.

5. A multiplexing system as claimed in claim 1 wherein the number of said listening channels is equal to *n* times *k*, where *k* is a whole number greater than 1, said first pulse source providing *n* pulses during *k* successive units of time, so as to produce a total of *n* times *k* pulses during *k* units of time, and said second pulse source providing one pulse after each *k* units of time, so as to provide a circular permutation of a step of one in the outputs of said demultiplexer means after each *k* units of time and to form one listening channel during each unit of time.

6. A multiplexing system as claimed in claim 1 wherein the number of said listening channels is equal to *n* divided by *k*, where *k* is a whole number greater than 1, said second source of pulses providing *k* pulses at the start of each unit time so as to cause a circular permutation of a step equal to *k* in the outputs of said demultiplexer, and to cause the formation of one listening channel per unit time.

* * * * *